United States Patent [19]

Wong et al.

[11] 4,008,161

[45] Feb. 15, 1977

[54] TREATMENT OF PULP MILL EFFLUENTS

[75] Inventors: Alfred Wong, Pointe Claire; Steven Prahacs, Beaconsfield; Joseph Dorica, Lachine, all of Canada

[73] Assignee: Pulp and Paper Research Institute of Canada, Canada

[22] Filed: Nov. 29, 1974

[21] Appl. No.: 528,478

[30] Foreign Application Priority Data

Nov. 28, 1973 Canada .............................. 186907

[52] U.S. Cl. .............................. 210/30 R; 210/40; 210/45; 210/53; 162/29

[51] Int. Cl.² .......................................... C02C 5/02

[58] Field of Search ............... 210/51, 52, 40, 39, 210/18, 20, 17, 150, 53, 15, 42, 45, 30 R; 162/29, 30

[56] References Cited

UNITED STATES PATENTS

| | | | |
|---|---|---|---|
| 3,244,621 | 4/1966 | Bouthilet | 210/39 |
| 3,619,420 | 11/1971 | Kemmer et al. | 210/40 |
| 3,763,040 | 10/1973 | Timpe et al. | 210/40 |
| 3,767,570 | 10/1973 | Clapp | 210/40 |
| 3,803,029 | 4/1974 | Blecharczyk | 210/40 |
| 3,855,120 | 12/1974 | Garbo | 210/20 |

*Primary Examiner*—Charles N. Hart
*Assistant Examiner*—Benoit Castel
*Attorney, Agent, or Firm*—Millen & White

[57] ABSTRACT

A multi-step method is provided for the purification of waste water, especially pulp mill effluents. It comprises a number of steps carried out in a specific sequence. The first step involves passing an oxygen-containing gas through the waste water while the waste water is in intimate contact with a finely divided activated carbonaceous material, preferably including, as a preliminary step, the addition of the finely divided activated carbonaceous material to the waste water. The second step involves adding a clarification agent selected from one or more of a coagulant, a flocculant, and a polyelectrolyte to the treated waste water provided by the first step. The third step involves recovering a solids-free effluent by known means, e.g. by a clarification step carried out by gravitational, flotational or centrifugal means to provide the waste water free of the suspended material originally contained therein and a sludge including the suspended material originally contained in the waste water, the added carbon and the added clarifying agent. Optionally, it includes the fourth step of regenerating the carbonaceous material from the sludge, and/or the fifth step of regenerating the clarification agent from the sludge.

19 Claims, No Drawings

TREATMENT OF PULP MILL EFFLUENTS

BACKGROUND OF THE INVENTION

This invention relates to the treatment of waste water and more especially, waste effluent from the manufacture of pulp and paper, the so-called pulp mill effluents. More particularly, the present invention relates to the purification of waste effluents from the manufacture of pulp from lignocellulosic materials, utilizing an improved physical-chemical processing scheme.

As is well known, large volumes of water are used in the manufacture of bleached kraft pulp. After using and possibly reusing the water in various processing steps, the effluent produced invariably contains various deleterious substances dissolved in the effluents, such as, for example, toxic and colored compounds and chemicals that have significant biological oxygen demand (BOD). Toxicity, color and BOD are not necessarily mutually exclusive properties of deleterious substances. In addition to the above, significant quantities of suspended solids in forms of pulp fibres, bark fines, etc. are present. Toxic substances may be derived from the pulping process as well as from the bleaching and the sheet-forming processes. The nature of these toxic substances may be wood extractives, such as, for example, resin acids, lignin degradation products, such as, for example, guaiacol and catechol and other phenolic compounds or chlorinated lignin degradation products including chlorinated phenols. When these waste waters are discharged directly into receiving waters, they may cause acute as well as chronic toxicity to fish and other aquatic life. Colored substances may be chromophoric compounds derived from both the pulping and bleaching processes. It is known that highly-colored effluent may damage the ecological balance of receiving waters as the penetration of sunlight necessary for photosynthesis of phytoplanktons is severly reduced. The problem of discharging these effluents into receiving waters is becoming increasingly acute as new regulations are promulgated by federal, state and local governments limiting such discharges.

Waste water effluent has been treated as taught in Canadian Pat. No. 813,770 issued May 27, 1969 to L. Ruus, by first acidifying the effluent to a pH below 5 and then scrubbing resultant released gases with an alkaline medium having a pH of above 12.

Kraft pulp-mill effluent treatment has been described in Canadian Pat. No. 884,785 issued Nov. 2, 1971 to C. T. Jones as including three stages, one of the stages involving passing spent cooking liquor through a filter bed containing a humic acid-type coal material.

Canadian Pat. No. 928,909 issued June 26, 1973 to J. P. Morgan and F. E. Murray provides a procedure in which, as one of the steps, a molecular-oxygen-containing gas is bubbled in a pool of the black liquor.

None of these patents provides a thoroughly effective procedure.

Canadian Pat. No. 870,299 issued May 4, 1971 to R. S. Joyce and D. G. Hager describes a clarification/adsorption system for the treatment of sewage. In this system, chemical clarification and filtration are utilized in an attempt to achieve suspended and colloidal solids removal. The sewage is first subjected to a preliminary treatment. Then a coagulant is added and the sewage sent to a clarification tank. The sludge is removed and an optional filtration step may be used to enhance sludge removal and to provide clarified sewage. The clarified sewage is then sent to a carbon adsorption zone. An optical filtration step is then carried out. A large number of coagulants and polyelectrolytes have been disclosed as being useful in such patent including organic polymers (e.g. polyacrylamides), iron salts, aluminum salts, and lime. The role of the activated carbon adsorption step is the removal of soluble organics from the waste water. The total organic removal achieved by the combination of clarification and carbon adsorption is quite high (95%+) and the residual organics after treatment are quite low. Such effluents are superior to the usual quality of secondary effluent (TOC $\approx$ 20 mg/l, COD $\approx$ 45–50 mg/l). However, to attain such quality, the carbon requirement is so high as to be prohibitively expensive if regeneration and reuse of the exhausted carbon were not possible.

Thus, as described above, it has been known that activated carbon, in either granular or powdered form, can effectively remove color, odor and taste-causing components from many types of municipal and trade waste waters. The principal reaction taking place during such a treatment appears to be physical adsorption of the deleterious substances on the surface of the carbon particles. To a much lesser extent, some chemical reactions at the carbon surface may also occur simultaneously. In the presence of oxygen or air, these chemical reactions, often catalytic in nature, are greatly enhanced. Aeration with either air or oxygen alone is known to be less effective. Carbon in this case can act as an oxidation catalyst, as shown for instance in West German Offenlegungschrift 2,050,874. However, the treatment, as described in the latter patent disclosure, requires an impractical quantity of activated carbon, namely 1 to 4% by weight of the effluent (i.e. 10,000 to 40,000 mg/l) to effect adequate treatment. This, for a typical volume of effluent of $20 \times 10^6$ U.S. gals. discharging from a 500 ADT/day bleached kraft pulp mill, would amount to 830 to 3320 tons of activated carbon per day which would have to be circulated in the treatment system. Moreover, with a specified makeup of five to ten percent (i.e. 41.5 to 332 tons/day) of fresh activated carbon, the treatment process becomes totally impractical and uneconomical. The process described in the Offenlegungschrift proposes to remove the used carbon by filtration. The use of flocculants is mentioned in the Offenlegungschrift as an optional processing step preceding the treatment with recycled carbon.

SUMMARY OF THE INVENTION

An object of a broad aspect of this invention is to provide an effective method for removing simultaneously toxic, color and BOD materials from waste water, in general, and from pulp and paper mill effluents in particular.

By a broad aspect of this invention, a multi-step method is provided for the purification of waste water, e.g. pulp mill effluent. The method involves a number of specified steps carried out in a particular specified sequence. The first step involves passing an oxygen-containing gas through the waste water, e.g. pulp mill effluent, while the waste water, e.g. pulp mill effluent, is in intimate contact with a finely divided activated carbonaceous material. The second step involves the addition of a clarification agent selected from one or more of coagulants, flocculants, or polyelectrolytes to the waste water, e.g. pulp mill effluent, so provided.

The third step involves the recovery of a solids-free effluent by known means.

Upon further study of the specification and appended claims, further objects and advantages of this invention will become apparent to those skilled in the art.

DETAILED DISCUSSION

The first step involves passing an oxygen-containing gas, e.g. air, through the waste water effluent while it is in intimate contact with the finely divided activated carbonaceous material. As an optional preliminary step, fresh (or thermally regenerated) powdered or fine granular activated carbon or similar carbonaceous materials or combinations thereof is added to the pulp mill effluent to be treated. Carbonaceous materials contain elemental carbon and may be flyash, bark or any wood waste burning materials or any other high surface materials such as, for example, green liquor dregs, or wood or bone charcoal, or activated carbon fabric. The dosage would range from 10 to 8000 mg/l, preferably between 25 to 2000 mg/l, with the actual dosage being dependent on the concentration of the objectionable components in the waste water, e.g. pulp mill effluent, and on the degree of purification desired. The first step also includes passing air or other molecular oxygen-containing gas through such waste water in the presence of the above-described carbonaceous materials.

The second step involves the subsequent addition of a clarification agent. Such agent may be one or more of coagulants, flocculants and/or synthetic polyelectrolytes. The clarification agent may be one or more of the agents listed in the above-identified Canadian Pat. No. 870,229, the contents of which are hereby incorporated herein by reference. Examples of coagulants or flocculants include alum, lime, ferric chloride, and activated silida. Examples of synthetic polyelectrolytes include non-ionic polyacrylamides and anionic polyacrylamides. Combinations of one or more of coagulants or flocculants with the polyelectrolytes may be used. The polyelectrolyte dosage, if a polyelectrolyte is used, would range from 0.1 to 20 mg/l. The dosage of other clarification agents would range from 10 to 2000 mg/l.

The third step involves recovering a solids-free effluent by known means. The known means preferably involves a sedimentation or clarification step, which may be done either by gravitational, flotational or centrifugal means, to provide a removed sludge containing suspended material originally contained in the waste water and/or coagulant and/or flocculant and/or carbon.

An optional fourth step involves the thermal regeneration of the spent carbon from the removed sludge. An optional further step includes the regeneration of the clarification agents from the removed sludge.

The processing steps described above may be easily effected in simple mixing tanks or in "in-line" pipe mixing devices. The removed sludge may be incinerated in any hog-fuel type furnaces or regenerated for reuse by suitable thermal processes (e.g. in Herreshof furnaces, or in fluidized beds) at 600° to 900° C., or it may be used as a landfill. Clarification agents, e.g. coagulants such as, for example, alum and ferric chloride, may also be regenerated concomitantly with the carbon for reuse by acid leaching of the carbonaceous product of the thermal treatment. Alternatively, the clarification agent by itself, for example, by acid leaching of the sludge may be regenerated.

The method provided by broad aspects of the present invention provides means for the removal of toxic materials, color bodies, and BOD substances from waste water, e.g. pulp and paper mill effluents, with the advantages of low cost of reactants because of the relatively very low dosages of carbon or similar materials and clarification agent, e.g. coagulants or flocculants, and simplicity of operation.

As noted above, the individual steps used in the method of broad aspects of the present invention are not novel by themselves. However, the combination of steps carried out in the specific sequence as described herein is not only novel, but more importantly, also produces a surprising synergistic effect resulting in reducing the carbon as well as the coagulant requirements to a fraction of that conventionally required by the prior art.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

Ten liters of the total effluent of a bleached softwood kraft pulp mill were mixed with 200 mg/l of a commercially available powdered activated carbon (sold by Westvaco under the Trademark of "Aqua Nuchar-A") for 5 minutes in a conventional mixing tank. After this operation, oil-free compressed air at 10 psig was added through a sintered glass sparger at a rate of 5 scfh (standard cubic feet per hour) for a period of 30 minutes. The height of liquid in the mixing tank was 8 to 10 inches. Next, 100 mg/l of alum and 1 mg/l of a polyelectrolyte sold by Allied Colloids Ltd. under the Trademark of Percol 351 were added, both in the form of dilute aqueous solutions. After brief, mild agitation to disperse the coagulants, the test liquid was allowed to settle under gravity for a period of 4 to 8 hours. The supernatant was decanted and neutralized to a pH between 7 and 8 prior to subjecting it to fish bioassays, cited in this and following examples, 5 rainbow trout fingerlings (Salmo gairdneri) of an average weight of 0.4 gram were placed in 5 liters of test solution. The 5 liters of test solution were composed entirely of treated effluent. The temperature of bioassays was maintained at 9±1° C. and the dissolved oxygen content was kept near the saturation point at the prevailing test temperature by aeration. In the bioassay tests, a fish was considered deceased when it showed complete loss of equilibrium and/or it remained motionless even when stimulated by an external mechanical means. All dead fish were removed from the test tank as soon as detected. Eighty percent survival time (EST) used in evaluating the various effluents is defined as the time at which 20% of the test fish population has deceased (or, conversely, 80% of the test fish population remained alive).

Color of the test effluent was measured at the wavelength of 450 nanometers with a Bausch and Lomb Spectronic 20 Spectrophotometer and was reported in APHA color units based on the Co-Pt color scale. Prior to color measurement, the pH of the test sample was first adjusted to 7.6±0.1 with either NaOH or $H_2SO_4$. The net quantity of NaOH or $H_2SO_4$ used in pH adjustment was maintained at less than 5% of the volume of the effluent sample and the test sample was then filtered under gravity through a sheet of Whatman No. 42 filter paper.

Five-day BOD ($BOD_5$) and COD were determined by the method generally used in the trade. For example, see "Standard Methods for Water and Wastewater Examination", Thirteenth Edition, published by the American Public Health Association, New York, 1971.

The following tables set forth the test conditions and results of a series of examples to demonstrate the beneficial and surprising synergistic effects of sequential processing steps as provided by the method of the present invention.

TEST CONDITIONS

| Example No. | Carbon Dosage mg/l | Aeration Rate scfh/l | Alum Dosage mg/l | Polyelectrolyte Dosage mg/l |
|---|---|---|---|---|
| 1 (control) | nil | nil | nil | nil |
| 2 | nil | 0.5 | nil | nil |
| 3 | nil | nil | 100 | nil |
| 4 | nil | nil | 100 | 1 |
| 5 | 300 | nil | nil | nil |
| 6 | 200 | 0.5 | nil | nil |
| 7 | 200 | 0.5 | 100 | 1 |

TEST RESULTS

| Example No. | EST hrs. | $BOD_5$ mg $O_2$/l | % Removal | COD mg $O_2$/l | % Removal | Color APHA Units | % Removal |
|---|---|---|---|---|---|---|---|
| 1 (control) | 2.5 | 360 | — | 1065 | — | 3000 | — |
| 2 | 3.3 | 335 | 7 | 1005 | 6 | 2850 | 5 |
| 3 | 7.3 | 300 | 17 | 880 | 17 | 2200 | 27 |
| 4 | 9.1 | 290 | 19 | 870 | 18 | 2100 | 30 |
| 5 | 5.6 | 310 | 14 | 990 | 7 | 3300 | <0 |
| 6 | 10.5 | 250 | 31 | 850 | 20 | 2850 | 5 |
| 7 | >96 | 255 | 29 | 600 | 44 | 750 | 75 |

The results showed that sequential application of very small amounts of carbon coupled with passing air through the waste effluent and subsequent addition of alum and polyelectrolyte for the separation of the carbon produced a higher degree of detoxification of waste effluent than could be obtained by summation of each processing step evaluated individually. In other words, the total increase in EST arising from each processing step taken individually was 18.0 to 19.6 hours; the actual increase in EST in Example No. 7 when each processing step was applied sequentially as provided by the method of the present invention is at least 96 hours. Thus, there is clear evidence of real unexpected synergistic effect arising from the sequential treatment as provided by the method of the present invention.

Similarly, as a result of the sequential treatment of the method of the present invention, a higher reduction in color, BOD and COD was obtained. Although the synergistic reduction in BOD and COD was moderate, there was a marked synergistic reduction of color. Tht total reduction in color arising from each processing step taken individually (see Examples No. 4 and No. 6) was only 35%, whereas the total reduction in color as provided by the sequential treatment of the method of the present invention (Example No. 7) was 75%. This synergistic increase in color reduction via the sequential treatment is indeed surprising. Equally important, the requirements of activated carbon are reduced to a fraction of what would be required otherwise, and this reduction in carbon requirements makes the process practical for pollution abatement.

EXAMPLE II

This example is given to demonstrate the effectiveness of powdered bark char, a low-grade carbon produced in a hog-fuel furnace burning waste bark in the sequential treatment of a sample of test effluent, as provided by the process of the present invention.

The experimental conditions and results are given in the table below.

TEST CONDITIONS

| Example No. | Carbon Dosage* mg/l | Aeration Rate scfh/l | Alum Dosage mg/l | Polyelectrolyte Dosage mg/l |
|---|---|---|---|---|
| 8 (control) | nil | nil | nil | nil |
| 9 | nil | 0.5 | nil | nil |
| 10 | nil | nil | 100 | nil |
| 11 | nil | nil | 100 | 1 |
| 12 | 300 | nil | nil | nil |
| 13 | 200 | nil | 100 | 1 |
| 14 | 200 | 0.5 | 100 | 1 |

*powdered bark char (minus No. 325 mesh).

TEST RESULTS

| Example No. | EST hrs. | $BOD_5$ mg $O_2$/l | % Removal | COD mg $O_2$/l | % Removal | Color APHA Units | % Removal |
|---|---|---|---|---|---|---|---|
| 8 (control) | 2.5 | 360 | — | 1065 | — | 3000 | — |
| 9 | 3.3 | 335 | 7 | 1005 | 6 | 2850 | 5 |
| 10 | 7.3 | 300 | 17 | 880 | 17 | 2200 | 27 |
| 11 | 9.1 | 290 | 19 | 870 | 18 | 2100 | 30 |
| 12 | 2.6 | 340 | 6 | 1070 | 0 | 3250 | <0 |
| 13 | 9.3 | 320 | 11 | 1115 | <0 | 2200 | 27 |
| 14 | 70.0 | 260 | 28 | 620 | 42 | 650 | 78 |

Similarly to the case of the first series of examples above in Examples 2–7, the degree of purification, in terms of increase EST and decreases in BOD, COD and color, is substantially greater when the sequential treatment steps are applied as provided by the method of the present invention. The increase in EST arising from the sequential treatment is 67.5 hours as compared to an increase in EST of 10.1 hours, computed as the sum of individual processing steps. The synergistic effect of the sequential treatment according to the method of this invention is again evident.

Similarly, with moderate reductions in $BOD_5$ and COD, the increased reduction in color through the sequential treatment methods of the present invention was quite surprising. Sequential treatment provides an improved color reduction of nearly two-fold over the color reduction that would be obtained from each processing step taken individually. The addition of the individual results of Examples No. 9 and No. 13 produces a total removal of color of only 32%, whereas the sequential treatment according to the method of this invention (Example No. 14) provides a color removal of 78%.

It will be understood by those skilled in the art that if the concentration of pollutants is considerably higher in a specific effluent than those used in these examples, higher dosages of carbon and clarifying agents might have to be used. Intensive recycle and reuse of effluents, for example, might require a multiple of the dosages used in the above examples. However, in such a case, the total carbon-clarifying agent usage, e.g. per ton of pulp, would still be the same or less than for dilute effluents of larger volume. Similar considerations apply in a case where high BOD and COD removal efficiencies are to be achieved. In this case, regardless of the type of effluent, the dosages of chemicals will have to be increased proportionately and, of course, this would increase the usage of these agents not only in terms of concentration but also in terms of usage per ton of pulp.

The improvement arising from the method of the present invention is the sequential application of each of the individual steps of the use of carbon alone, carbon plus aeration, carbon plus coagulants and coagulants alone. It is noted that the "carbon plus aeration" system, as given in West German Offenlegungschrift 2,050,874 excluded the mechanism of physical adsorption from the invention. Also, it uses filtration for the removal - and then recycle - of the carbon. The present invention on the other hand incorporates adsorption, catalytic oxidation, as well as chemical precipitation. The improvement is greater than that expected from the direct summation of the benefits of each processing step taken separately. Moreover, the equipment for treatment is simple and dosages of reagents used are relatively low, of the order of less than 0.8% by weight (<8000 mg/l), typically 25 to 2000 mg/l. Also, one embodiment of the invention involves the thermal regeneration of the carbon used in the process.

In summary, the present invention provides the following advantages and improvements:

1. Lower dosages of carbon required.
2. Use of one or more clarifying agents to aid the setting of spent carbon as well as to enhance the degree of treatment of effluent attainable.
3. Use of simple conventional contacting equipment.
4. Use of a broad range of chemical unit operations, i.e. adsorption, catalytic oxidation, foam separation and precipitation or coagulation.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A multi-step physical-chemical method for the purification by adsorption, catalytic oxidation and chemical precipitation of kraft pulp mill effluent waste water containing undesirable solid materials in suspended and/or dissolved form, which comprises the following sequential steps:
   1. passing an oxygen-containing gas through the waste water at a rate of 0.05 scfh/1–5.0 scfh/1. while the waste water is in intimate contact with a finely divided activated carbonaceous material present in a concentration of 10–8000 mg/l to catalytically oxidize said undesirable materials;
   2. adding a clarification agent selected from the group consisting of a coagulant, a flocculant, a polyelectrolyte and mixtures thereof with the provision that when a polyelectrolyte is provided, it is in a concentration of 0.1–20 mg/l and when a coagulant and/or flocculant is provided, it is in a concentration of 10–2000 mg/l, to resultant waste water provided by step (1) to chemically precipitate said undesirable materials; and
   3. separating suspended solids in the form of sludge from the waste water by gravitation, flotation or centrifugation.

2. The method of claim 1 wherein said separating of step (3) is conducted by gravitation.

3. The method of claim 2 further comprising a fourth step of thermally regenerating the carbonaceous material at 600–900° C from the removed sludge.

4. The method of claim 3 including a fifth step of regenerating the clarification agent from the removed sludge by acid leaching.

5. The method of claim 1 further comprising a preliminary step of adding fresh finely divided activated carbonaceous material to the waste water to physically adsorb undesired materials.

6. The method of claim 1 wherein the activated carbonaceous material is produced from flyash, bark, woodwaste, green liquor dregs, wood charcoal, or bone charcoal and mixtures thereof, and activated carbon fabric.

7. The method of claim 6 wherein the activated carbonaceous material has a surface area of 100–1800 $m^2/g$, and wherein the amount of said carbonaceous material is 25–2000 mg/l.

8. The method of claim 1 wherein the amount of said carbonaceous material is 25–2000 mg/l.

9. The method of claim 1 wherein the gas is passed through the waste water at a rate of about 0.5 scfh/1.

10. The method of claim 1 wherein the clarification agent is a polyelectrolyte provided in an amount of 0.1–20 mg/l.;25;

11. The method of claim 1 wherein the clarification agent is a coagulant and/or a flocculant provided in an amount of 10–2000 mg/l.

12. The method of claim 1 wherein the waste water is an effluent from the manufacture of bleached kraft pulp.

13. The method of claim 12 wherein the finely divided activated carbonaceous material is powdered bark char.

14. The method of claim 1 wherein the clarification agent is a mixture of alum and polyelectrolyte.

15. The method of claim 14 wherein the dosage of activated carbonaceous material is about 200 mg/l, the gas flow rate is about 0.5 scfh/l, alum is employed in a dosage of about 100 mg/l and the polyelectrolyte dosage is about 1 mg/l.

16. The method of claim 15 wherein the activated carbonaceous material is powdered bark char having a particle size of minus 325 mesh.

17. The method of claim 1 wherein the finely divided activated carbonaceous material is fresh or thermally regenerated carbonaceous material.

18. The method of claim 1 wherein said separating of step (3) is conducted by flotation.

19. The method of claim 1 wherein said separating of step (3) is conducted by centrifugation.

* * * * *